Oct. 30, 1962 W. H. COX 3,061,832

MAGNETIC RECORDING APPARATUS

Filed Feb. 4, 1958

INVENTOR.
WILLIAM H. COX
BY
Busser, Smith & Harding
ATTORNEYS

United States Patent Office 3,061,832
Patented Oct. 30, 1962

3,061,832
MAGNETIC RECORDING APPARATUS

William H. Cox, Beaumont, Tex., assignor to Sun Oil Company, Philadelphia, Pa., a corporation of New Jersey Filed Feb. 4, 1958, Ser. No. 713,138
2 Claims. (Cl. 346—74)

Figure 1:
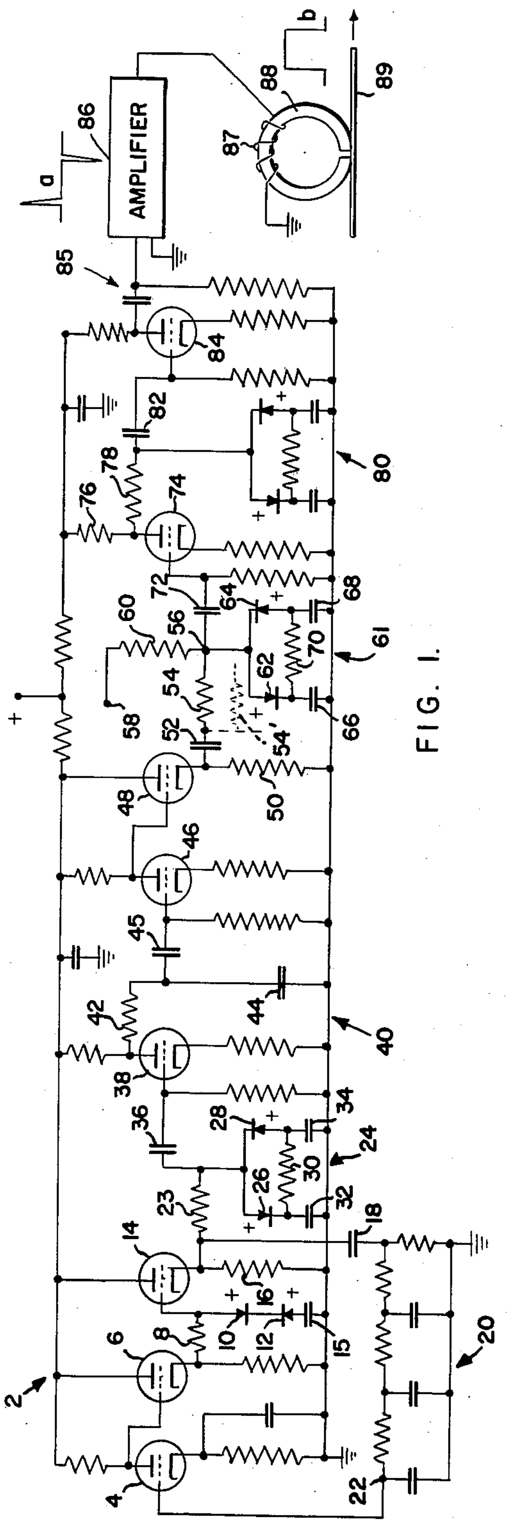

This invention relates to magnetic recording apparatus and has particular reference to a system for pulse recording in which remanent magnetism in a recording head is used to reduce driving power and bandwidth requirements of circuitry involved.

As will appear, the invention is of general applicability to magnetic pulse recording whether of the pulse width or pulse time type. The invention is particularly advantageous in its applicability to recording in connection with seismic prospecting, and, accordingly, the following description will be particularly directed to such use of the invention although it will be understood that its utility is not correspondingly limited.

Pulse width and other modulated carrier systems have inherent advantages in recording low frequency signals on magnetic tape. Carrier type systems such as those involving frequency modulation, pulse width modulation and pulse position or time modulation can be made relatively independent of characteristics of the recording medium. Amplitude variations in recording or playback can be removed before demodulation and the signal-to-noise ratio is increased due to this limiting or non-linear filtering process. Pulse width and certain types of pulse position systems also tend to cancel noise due to variations in tape speed.

A pulse width modulated signal can be produced with simple apparatus using few components. Multiple channel recording can be further simplified by use of a common carrier signal source. Although a pulse width modulator may be simple, it is not efficient in utilization of power. Compact, light weight recording equipment for field use, for example, in seismic prospecting, must also have small power requirements. The present invention relates particularly to improvement in the efficiency of the modulating system.

Conventional pulse width recording methods require that each recording head be provided with driving magnetomotive force which will saturate the recording tape continuously. Switching alternately from one polarity of pulse to the other does not alter this input requirement, but switching adds a reactive component to the load due to inductance of the recording head. A special low inductance recording head has therefore been required to reduce the driving voltage. This type of recording head has windings with few turns and therefore more current is required to maintain saturation during each pulse. It is evident that much power is wasted in a recording head designed for fast rise, short duration, puulse recording when it is used for pulse width recording.

Recording heads which must be used for reproduction must have high permeability and, therefore, low retentitivity. If a head is used for recording only, high permeability is not essential. In accordance with the invention, a special recording head may be provided which will magnetize the tape continuously in one direction by permanent polarization retained in the head. External energy in the form of short duration pulses only is required to reverse polarity of the remanent magnetism to switch between positive and negative pulses. Total power requirements are thus considerably reduced since power is not supplied continuously. Another advantage of supplying all of the power in the form of short duration pulses is that low frequency components are not involved in the signals, and, accordingly, a driving amplifier need not be able to pass low frequencies at all. Magnetic retentivity of the head may be made great enough to magnetize the tape by a change in core material of the head without any other basic change. As an alternate, the back gap provided on some recording heads may be closed with a thin section of magnetically hard material. This hard or high coercive force material is in series with the magnetic circuit of the head so that it will retain magnetization at the same polarity as the applied magnetomotive force. The minimum residual magnetism of remanence needed should be used so that minimum energy will be required to reverse polarity of the head.

A recording head provided in accordance with the invention making use of remanent magnetism may be considered a form of magnetic integrator. The input signal, consisting of a series of pulses of short duration alternating in polarity is the first time derivative of the pulse width signal to be recorded. The head integrates the applied signal and records the magnetic counterpart of this integral. A conventional magnetic reproducing head produces an output which is the first time derivative of the magnetic signal on the tape. The output signal on playback would, accordingly, be the same as the original input signal applied to the integrating recording head. As a result, no change in form of the signal is needed, other than amplification, for re-recording in accordance with the invention. This feature is useful in a magnetic recording variable time delay system in which reproduction and re-recording may follow one another without demodulation.

Figure 2:
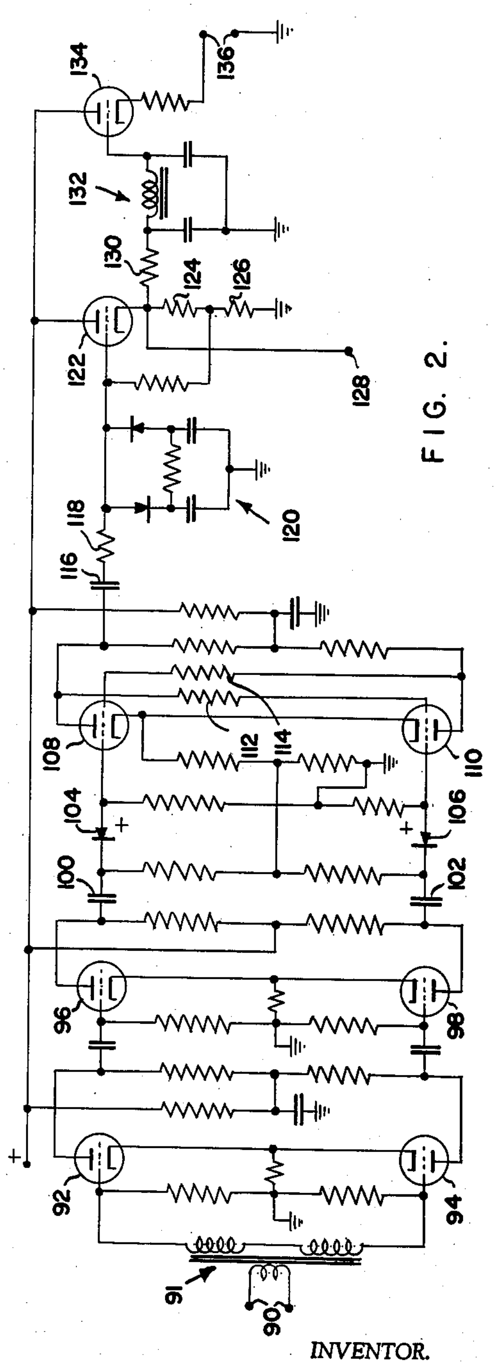

The objects of the present invention relating to the attainment of the foregoing ends will become apparent from the following description, read in conjunction with the accompanying drawing, in which:

FIGURE 1 is a wiring diagram shownig a preferred form of system for producing pulse width recording in accordance with the invention; and FIGURE 2 is a wiring diagram of a suitable reproducing system.

While the means for exciting a recording head in accordance with the invention may take numerous forms, there is indicated in FIGURE 1 a complete circuit which is highly satisfactory for this purpose and from which there will be fully apparent the matters involved. Reference will be particularly made to the recording of low frequency seismic signals used to modulate a pulse width record. The circuitry shown in FIGURE 1 up to the point of actual drive of a recording head is essentially that disclosed in the application of Norman B. Blake and William E. Holtkamp, Serial No. 649,485, filed March 29, 1957.

There is indicated generally at 2 an oscillator, which is claimed in Blake and Holtkamp application, Serial Number 649,489, filed March 29, 1957, and which is particularly advantageous in the production of a carrier which may typically have a frequency of 600 cycles per second in seismic work. This frequency is by no means critical and may be widely varied depending upon the results desired. The oscillator comprises a triode 4 associated with an anode load resistor and providing an amplified output through a direct conductive connection to the grid of triode 6 connected in a cathode follower arrangement. The output from the cathode of triode 6 is delivered through a resistor 8 to an arrangement of diodes 10 and 12 arranged oppositely in series and connected through a large capacitor 15 to ground. These diodes are of a known reference type which have the property of breaking down when the reverse potential across them exceeds a definite value such as 3½ volts for each diode. The ungrounded end of this diode arrangement is connected to the control grid of triode 14 which is arranged in a cathode follower circuit with a cathode resistor 16. The output of this cathode follower is delivered through capacitor 18 to a phase shift lag line 20 constituting a low pass filter which filters out essentially everything but a fundamental wave and accordingly provides an output from a terminal 22 to the grid of amplifier triode 4 which is substantially a pure sine wave. The frequency of oscillation is determined by that frequency which through the phase shift line 20 provides a 180° phase shift. The number of sections of the line 20 may be increased to provide additional filtering action to secure as nearly a pure sine wave output as may be desired.

The oscillator just described has considerable advantage over other oscillators for the purposes here involved. The usual phase shift oscillator is barely on the point of oscillation whereas the present oscillator may have violent oscillations with maintenance of a substantially constant output and feed back irrespective of the gain of the amplifier stage involving triode 4. This results from the fact that the diodes 10 and 12 limit the peak-to-peak signal appearing at the grid of the cathode follower triode 14. For example, if each of the diodes 10 and 12 breaks down at 3½ volts, the peak-to-peak amplitude at the grid of triode 14 will be approximately seven volts irrespective of the gain of the amplifier. The capacitor 15, of course, acquires a positive potential, due to the D.C. connection between the anode of triode 4 to the grid of triode 6, on which positive potential the alternating signal is superposed. A substantially pure sine wave input to the triode 4 gives a sine wave output therefrom, with small distortion, greatly in excess of the peak-to-peak signal appearing at triode 14. The result is that at the cathode of triode 14 there appears (superposed on a constant D.C. base) a square wave of substantially constant amplitude differing from an exact square wave by being somewhat rounded. The feed-back through the line 20 removes from this square wave its harmonic components to deliver a substantially pure fundamental sine wave to the tube 4. Substantially constant frequency is maintained since the oscillations occur at that frequency which has a 180° phase shift through the passive network 20. If adjustability of frequency is desired, the resistors and capacitors of the network may be made variable. Conventional network theory gives the resistance and capacity relationships which for a given frequency results in the 180° phase shift and optimum filter action, and hence that need not be detailed herein.

The output from the cathode of triode 14 is delivered through resistor 23 (e.g. having a value of 500,000 ohms) to a limiter indicated generally at 24. This limiter comprises the oppositely arranged diodes 26 and 28 connected to the output end of resistor 23 and through respective capacitors 32 and 34, each of large capacity, for example, 0.47 microfarad, to ground. The ungrounded ends of the capacitors are connected through a resistor 30 which may typically have a resistance of 50,000 ohms. This limiter has a self-balancing action providing at the output end of resistor 23 a good square wave in the sense that its corners are much sharpened as compared with the wave at the cathode of triode 14. The self-balancing action may be described as follows:

In the usual limiter, batteries would be provided at 32 and 34 to bias the diodes to prevent conduction until the input to each exceeded the bias voltage. In the present instance, the capacitors become charged, 32 positively and 34 negatively (both with respect to a positive base potential corresponding to the mean positive potential of the cathode of triode 14), with the high value resistor 30 tending to effect their mutual discharge. A tendency for either towards an increased potential relative to the base potential results in a greater current flow through resistor 30 and the result is that for a given constant amplitude and frequency of the approximately square wave input at the cathode of triode 14, they have substantially constant potentials at the times of pulse rises. The result is a balanced output due to resistor 30 within which lies the base potential. The resistor 30 thus self-balances the limiter to a substantial degree irrespective of differences in characteristics of the diodes 26 and 28 and with avoidance of the necessity of independently balancing to center the conventionally used batteries.

The resulting square wave is delivered through capacitor 36 to the grid of triode 38 arranged in an amplifying circuit the output of which is delivered to an integrator, generally designated 40, and comprising the resistor 42 and the capacitor 44, the latter being connected to ground. While a more elaborate form of integrator might be used, for the purposes here involved the simple resistance-capacitance integrator illustrated is ample. The integration provides an isosceles triangular wave which is delivered through the capacitor 45 to the grid of a triode 46 arranged in a conventional amplifier circuit and providing its output to the grid of a triode 48 in a cathode follower circuit including the cathode resistor 50. The amplifier triangular wave is delivered through capacitor 52 to one or more resistors 54 extending to one or more terminals 56.

The triangular wave generator constituted by the portion of FIGURE 1 to the left of the output terminal of capacitor 52 may suffice to provide carriers for a number of channels involved in seismic recording. For example, it is common to have a large number of these channels individual to seismic detectors, a typical number being 24 channels. To the right of capacitor 52, accordingly, there is indicated the circuitry involved in the matter of a single channel, the connections providing triangular wave inputs to similar circuits for other channels being indicated at 54′.

Considering, now, a single channel, the terminal 56 has a second input through resistor 60 from a terminal 58 receiving from an individual channel amplifier an amplified signal from a single seismic detector. Referring to the seismic signal as the modulating signal, this modulating signal and the triangular carrier delivered to the terminal 56 are clipped by the limiter indicated generally at 61 which has a construction similar to the limiter previously described at 24, consisting of the oppositely disposed diodes 62 and 64 connected to the terminal 56, individually connected to ground through the capacitors 66 and 68, and interconnected by the resistor 70. The action of the limiter 61 is to clip variously the peaks of the triangular carrier waves which are, in effect, caused to vary upwardly and downwardly in accordance with the modulating signal. The result is an output through capacitor 72 to the grid of amplifier triode 74 of an essentially constant frequency somewhat trapezoidal wave in which the tops and bottoms of the individual waves vary in width depending upon the modulation. The resulting wave is amplified in the amplifying circuit comprising the triode 74 and its anode load resistor 76 and delivered through a resistor 78 to a second limiter 80 which has the same construction as limiter 61. In this limiter further clipping takes place with the result that through capacitor 82 there is delivered to the grid of triode 84 a wave which is essentially rectangular consisting of pulses the widths of which vary so that the output is a pulse width modulated carrier, the pulse widths corresponding to the amplitude of the modulating seismic signal. The relationship of pulse width to modulating signal amplitude is, furthermore, linear due to the clipping of a triangular wave.

Up to this point the circuit is the same as that disclosed in the Blake and Holtkamp application first referred to above.

Triode 84 is arranged in an amplifying circuit feeding its output to a differentiator 85 of conventional type comprising a capacitor and resistor from the junction of which the differentiated signal is fed to the amplifier 86. The result of the differentiator is to feed to the amplifier 86 a wave which for a single pulse has the form indicated at *a* above this amplifier. In brief, the signal thus provided consists of sharp positive and negative spikes corresponding to the rise and fall, respectively, of a rectangular pulse appearing at the anode of triode 84. This waveform *a* is the first time derivative of the pulse. The waveform *a* is fed by the amplifier 86 to the energizing winding 87 of the recording head which comprises the core 88 provided with a gap across which the magnetic tape 89 is fed. Since only sharp pulses feed through the amplifier 86, there is no necessity for providing an amplifier having broad bandwidth characteristics, and the amplifier may be chosen only to pass the sharp spikes indicated.

The construction of the recording head is not detailed since it may have the identical arrangement of parts characteristic of any conventional recording head, the difference being solely in the fact that its core material has a high remanence so that each short current spike delivered thereto produces a permanent magnetization which is changed only by a spike of opposite sign. This end is achieved merely by making the core of hard magnetic material or by accomplishing the same result by including in a conventional core a portion of hard magnetic material as by the closure with such material of the back gap which is sometimes used in a conventional recording head to provide a demagnetizing effect. In the case of the adoption of either of such arrangements, a magnetic polarity will remain after each spike until reversed by another. The result, accordingly, is to record on the tape 89 variable width pulses having the form indicated at *b* which is identical with the form of pulses delivered to the grid of triode 84, the pulse *b* being merely the integral of the signal indicated at *a*.

The advantages of the invention will now be apparent, since it will be evident that the energy required for the excitation of the recording head will be very much less than that which would be required for a conventional recording head wherein the current would be required to maintain magnetization during each positive and negative pulse to be recorded. The amount of power required to be delivered by amplifier 86 is small so that a small amplifier having low input power requirements may be used. As already indicated, the amplifier need not be of a type having broad band characteristics.

In the case of seismic work, it is often desirable to rerecord signals from an original tape record to another tape which may be driven at a different and usually variable speed. Since this is a known practice, explanation of reasons and techniques need not be given herein. However, the present invention lends itself advantageously to this as follows:

If a record such as that indicated as produced on tape 89 is reproduced by a conventional magnetic head, the output signals of such head correspond to the first time derivative of the recorded signal. In other words, a pulse such as indicated at *b* is actually reproduced in the form indicated at *a*. Ordinarily, to provide rerecording it is necessary to convert the first derivative signal such as at *a* back to the rectangular pulse *b* by the use of a multivibrator or some other arrangement triggered by the spikes forming the first derivative signal. Utilizing the present invention re-recording is extremely simple, since, using an ordinary reproducing head to pickup the signal from the tape, and accordingly providing its first time derivative, this derivative with nothing more than straight amplification can ordinarily be provided directly to the type of recording head 87, 88 already described which will provide by its own integrating action a recovery of the original pulse signal.

In some cases, it may be desirable to effect some reforming of pulses, and to illustrate this and also to complete the picture herein presented by showing how a pulse width record may be transformed to recover the original modulating signal in the form of an amplitude record, a reproducing circuit is shown in FIGURE 2 which may receive a signal derived from a pulse width modulated carrier either to deliver the original variable amplitude seismic wave which produced such record or to redeliver a pulse width modulated carrier in a re-recording procedure.

In FIGURE 2 the input is provided at the terminals 90 of a transformer 91, and this input from a magnetic record of a pulse width modulated carrier will actually consist of the first time derivative of the actual record. The input will be essentially of the form shown at *a* in FIGURE 1.

Assuming the input to be of the type just mentioned, consisting of sharp, positive and negative peaks, the signal is successively amplified in the conventional stages comprising first the pair of triodes 92 and 94 and second the pair of triodes 96 and 98, so that amplified signals are provided through the capacitors 100 and 102. The signals thus provided are fed to the diodes 104 and 106 which are similarly disposed and associated with a resistance array as shown in FIGURE 2. The diodes are respectively connected to the grids of triodes 108 and 110, the grids and anodes of which are cross-connected through resistors 112 and 114 to provide a conventional bistable multivibrator or flip-flop which may be triggered by the negative peaks delivered through the diodes. (It will be noted that the originally mentioned positive and negative peaks at the input terminals 90 will produce respective negative peaks appearing at the respective grids of the triodes 108 and 110.)

The resulting output from the multivibrator delivered through capacitor 116 is, accordingly, a rectangular wave, the positive excursions of which, for example, correspond in duration to the lengths of the pulses of the original modulated carrier, while the negative excursions of which correspond in duration to the lengths of the intervals between such pulses. The amplitude of the rectangular wave delivered through capacitor 116 will not ordinarily be constant, and accordingly it is delivered through resistor 118 to the limiter 120 which may be similar to limiters 24 and 61 previously discussed. As a result there is delivered to the grid of triode 122 a substantially constant amplitude rectangular wave or viewed otherwise, a series of rectangular pulses corresponding to those of the record being reproduced.

It may be here noted that the network consisting of capacitors 100 and 102, diodes 104 and 106, and the interconnecting resistors effects balancing of the system so that the multivibrator triggers at a certain percentage of the peak value of the input pulses rather than at absolute voltage levels.

The triode 122 is in a cathode follower circuit including the cathode resistors 124 and 126 arranged in series. From the cathode there may be delivered to terminal 128 the rectangular wave, or series of pulses, for re-recording. If this re-recording is to be on a magnetic tape, the output at terminal 128 may be delivered to a differentiator such as 85 and thence to the elements following this differentiator as shown in FIGURE 1 to provide another magnetic record utilizing the new type of recording head. While this would seem to be more simply accomplished merely by using the signals from the input terminals 90, there will ordinarily be a deterioration of the sharpness of the spikes involved through the recording and successive reproduction, and a somewhat better record will result if there is utilized the circuitry involved in FIGURE 2 functioning primarily only as a wave reshaping device. In other words, sharply rectangular pulses may be thus produced in the re-recording operation.

If it is desired to recover the original seismic modulating signal, the cathode of triode 122 is connected through resistor 130 to the low pass filter 132 designed to pass only the modulating signal. The output of this filter is delivered to the grid of triode 134 to provide an output between the terminals 136, which output will be essentially the modulating wave.

While pulse width recording has been particularly referred to in the foregoing detailed description, it will be evident that the invention is also applicable to the recording of pulse position or time signals. In any case in which pulses are to be recorded, there are secured the advantages of low power requirements for excitation of a recording head and of simplification of the amplifier used. It will accordingly be evident that the invention is not to be regarded as limited except as required by the following claims.

What is claimed is:

1. Apparatus for the magnetic recording of pulses comprising
   means for producing short duration pulses,
   a magnetic recording head having a high remanence core provided with a gap,
   a magnetizable member movable across said gap to be magnetized by flux in said core,
   and a winding on said core for magnetization thereof,
   and means connecting the first mentioned means to said winding,
   the high remanence being such that each of such short duration pulses produces magnetization of said core persisting until the occurrence of a succeeding pulse.

2. Apparatus for the magnetic recording of pulses comprising
   means for producing rectangular pulses, differentiating means receiving said pulses and producing short duration pulses corresponding to the ends of said rectangular pulses,
   a magnetic recording head having a high remanence core provided with a gap,
   a magnetizable member movable across said gap to be magnetized by flux in said core,
   and a winding on said core for magnetization thereof,
   and means connecting the second mentioned means to said winding,
   the high remanence being such that each of such short duration pulses produces magnetization of said core persisting until the occurrence of a succeeding pulse.

References Cited in the file of this patent

UNITED STATES PATENTS

| | | |
|---|---|---|
| 2,794,066 | Mullin | May 28, 1957 |
| 2,797,339 | Steagall | June 25, 1957 |
| 2,802,953 | Arsenault et al. | Aug. 13, 1957 |
| 2,822,533 | Duinker et al. | Feb. 4, 1958 |
| 2,890,440 | Burkhart | June 9, 1959 |
| 2,912,515 | Lufcy | Nov. 10, 1959 |
| 2,933,718 | Arsenault | Apr. 19, 1960 |

FOREIGN PATENTS

| | | |
|---|---|---|
| 766,318 | Great Britain | Jan. 23, 1957 |
| 1,139,314 | France | June 27, 1957 |